United States Patent [19]
McEwan et al.

[11] 3,820,953
[45] June 28, 1974

[54] METHOD FOR MEASURING LIQUID PARTICLE DISTRIBUTION FROM FOGS, CLOUDS, AND SPRAYS

[75] Inventors: William S. McEwan, China Lake, Calif.; Charles M. Drew, Redstone, Colo.

[73] Assignee: The United States of America as represented by the Secretary of the Navy, Washington, D.C.

[22] Filed: Oct. 18, 1972

[21] Appl. No.: 298,707

[52] U.S. Cl. ......... 23/230 R, 23/253 TP, 73/170 R, 116/114 AM
[51] Int. Cl. ...................... G01n 17/00, G01w 1/14
[58] Field of Search ......... 23/230 R, 230 C, 232 R, 23/253 R, 253 TP; 73/170 R; 116/114 AM

[56] References Cited
UNITED STATES PATENTS

| | | | |
|---|---|---|---|
| 2,787,238 | 4/1957 | Luce | 116/114 AM |
| 3,084,658 | 4/1963 | Schell | 23/253 TP |
| 3,221,428 | 12/1965 | Fischler et al. | 23/253 TP |
| 3,740,196 | 6/1973 | Stroterhoff | 23/253 TP |

*Primary Examiner*—R. E. Serwin
*Attorney, Agent, or Firm*—R. S. Sciascia; Roy Miller; Lloyd E. K. Pohl

[57] ABSTRACT

A method for studying the size, number and distribution of droplets in fogs, clouds or sprays of the type produced by aerosols used in weather modification and the like.

3 Claims, 2 Drawing Figures

METHOD FOR MEASURING LIQUID PARTICLE DISTRIBUTION FROM FOGS, CLOUDS, AND SPRAYS

BACKGROUND OF THE INVENTION

1. Field of the Invention

This invention relates to a method for use in weather modification studies. More particularly, this invention relates to a method for studying droplets from fogs, clouds and sprays.

2. Description of the Prior Art

In weather modification programs and the like it is often desirable to determine the size, number and distribution of droplets in a given area of an aerosol fog, cloud or spray. Light scattering techniques are commonly used for this purpose. However, as a means for checking data obtained from light scattering techniques, other methods have been developed. These methods commonly involve the use of fallout meters of various shapes such as rotary plates, flat plates, etc., provided with slots to collect droplets of various predetermined sizes. These fallout meters utilize various collecting surfaces such as printflex paper, magnesium oxide coated slides, paper printed with indicating paint, gelatin coated plates and waterproofed collection tape. Each of the prior art collecting surfaces is adversely affected when the fog, cloud or spray contains a large amount of precipitation. A large amount of precipitation prevents the droplets from producing sharp marks or signatures on the collecting surface which truly represent the characteristics of free droplets.

As a more specific example, gelatin coated plates are commonly used in studying droplets from fogs, clouds or sprays. When certain aerosol sprays, such as ammonium nitrate/urea which is commonly utilized to disperse warm fog, strike gelatin the droplets tend to diffuse through the gelatin and do not give sharp outlines. Since the droplet size (volume) is directly related to the droplet diameter, a sharp outline is necessary. Therefore, gelatin coated plates are generally unsatisfactory for use in the study of ammonium nitrate/urea aerosols.

SUMMARY OF THE INVENTION

In the present invention apparatus comprising a smooth metallic mirror on a substrate of suitable composition such as plastic or glass is used to study droplets from fogs, clouds and sprays. The identity of the metal used in the metallic mirror depends upon the composition of the droplets being studied.

The method of the present invention involves providing apparatus of the type generally described above, exposing the apparatus to a fog, cloud or spray for a predetermined length of time to cause droplets to adhere to the surface and form signatures, setting the signatures for a predetermined length of time and drying the surface of the apparatus with a drying agent. The signature containing apparatus can then be sealed in clear plastic to provide a permanent record.

DESCRIPTION OF THE PREFERRED EMBODIMENT

Figure 1:
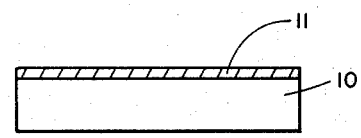
FIG. 1 is a cross section view of apparatus suitable for studying ammonium nitrate/urea aerosols.

Going first to the drawing, FIG. 1 depicts, in cross section, a substrate 10 coated by known vacuum deposition methods with a single metallic film 11. In studying ammonium nitrate/urea aerosols the metallic film may be a metal such as copper, cadmium, zinc or the like. In use the metal coated substrate of FIG. 1 is exposed to an aerosol utilizing an ammonium nitrate/urea carrying agent to allow droplets from the aerosol to contract the metallic film and adhere thereto. Contact may be accomplished by manually sweeping the device of FIG. 1 through a cloud of aerosol. Immediately after contacting the aerosol, the device with droplets adhering thereto is placed near an open container of acetic acid. Contact with fumes from the acetic acid causes the droplets to form signatures on the metallic film which correspond to the droplet diameters. Contact with the acetic acid fumes should be very brief — on the order of 0.5 second — to prevent corrosion of the metallic film. After contact with the acetic acid, the device is dried by rinsing in a drying agent such as ethanol to which a small amount of a base such as ammonia has been added to neutralize any acid in the ethanol.

Figure 2:
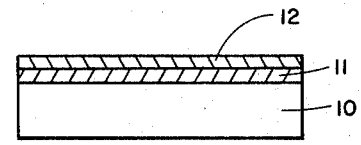
FIG. 2 is a cross sectional view of apparatus suitable for studying maritime fogs.

FIG. 2 depicts a device similar to that of FIG. 1 with the exception that a second metallic film 12 coats the first opaque metallic film 11. As in FIG. 1, the substrate 10 may be either glass or plastic. The device of FIG. 2 is useful in studying maritime fogs and the two metallic films 11 and 12 are of two different metals. For studying maritime fogs zinc (film 12) on either copper or cadmium (film 11) has been found to be satisfactory. In studies of maritime fogs it has been found preferable to limit the thickness of film 12 to about 200 angstroms or less. A thickness of 200 angstroms or less appears to leave minute holes in film 12 and allow traces of the droplets to contact film 11 and this produces more satisfactory results. On the other hand, film 11 in either FIG. 1 or FIG. 2 should be greater than 200 angstroms in thickness in order to completely prevent contact between droplets and substrate 10.

The method for using the device of FIG. 2 is the same as that for FIG. 1.

After signatures have been set by placing a droplet containing device near a container of acetic acid and the device has been dried a permanent record may be made by coating the device with clear plastic.

We claim:

1. A method for determining particle distribution from fogs, clouds and sprays which comprises:
   a. providing a device comprising a substrate coated on at least one side with at least one layer of metallic film;
   b. depositing liquid particles on said film by exposing said device to particle containing air;
   c. causing the liquid particles to form signatures which correspond to the droplet diameters on said film by placing said particle containing device near enough an open container of acetic acid to be in contact with fumes from the acetic acid for a predetermined length of time; and
   d. drying the device by rinsing in a drying agent.

2. The method according to claim 1 wherein said substrate is coated with a first opaque layer of copper and wherein said copper layer is then coated with a film of zinc.

3. The method in accordance with claim 2 wherein said signature is set by placing the signature containing film coated substrate near a container of acetic acid for about 0.5 second.

* * * * *